(12) United States Patent
Kramer et al.

(10) Patent No.: US 12,179,373 B2
(45) Date of Patent: Dec. 31, 2024

(54) VEGETABLE SLICING SHIELD

(71) Applicant: Better Trick, Inc., Columbus, NE (US)

(72) Inventors: James William Kramer, Columbus, NE (US); Daniel Stephen Jones, Leominster, MA (US); Joel Lieblein, Greenfield, MA (US); Steven Drake, Concord, MA (US)

(73) Assignee: Better Trick, Inc., Columbus, NE (US)

( * ) Notice: Subject to any disclaimer, the term of this patent is extended or adjusted under 35 U.S.C. 154(b) by 403 days.

(21) Appl. No.: 17/547,283

(22) Filed: Dec. 10, 2021

(65) Prior Publication Data

US 2022/0184835 A1 Jun. 16, 2022

Related U.S. Application Data

(60) Provisional application No. 63/124,210, filed on Dec. 11, 2020.

(51) Int. Cl.
*B26B 29/06* (2006.01)
*B26B 29/02* (2006.01)

(52) U.S. Cl.
CPC ............ *B26B 29/063* (2013.01); *B26B 29/02* (2013.01)

(58) Field of Classification Search
CPC ..... Y10S 83/932; B26B 29/063; B26B 29/02; B26B 29/00; B26B 29/06; B26B 2029/066; B26D 7/0006; B26D 7/01; B26D 7/22; B26D 7/225; B26D 2007/0012; B26D 2210/00; B26D 2210/02; B26D 2210/06
USPC ...................................... 30/124, 114
See application file for complete search history.

(56) References Cited

U.S. PATENT DOCUMENTS

| | | | | |
|---|---|---|---|---|
| 1,764,235 | A * | 6/1930 | Wilmking | B26B 29/063 83/762 |
| 5,653,154 | A * | 8/1997 | Liu | B26B 29/063 83/468.5 |
| 8,112,804 | B2 * | 2/2012 | Kwon | H04L 63/1416 370/352 |
| 2015/0217470 | A1 * | 8/2015 | Lowetz | B26B 29/063 269/288 |

\* cited by examiner

*Primary Examiner* — Phong H Nguyen

(57) ABSTRACT

A vegetable slicing shield includes a root, a u-shaped handle, and a plurality of tines. The root is medially disposed between the u-shaped handle and the tines. The u-shaped handle is coupled with the root at opposing lateral regions of a first side of the root. The plurality of tines have first ends coupled with a second side of the root and extending outward from the root to second ends which form a row spaced apart points. Open slots are defined between adjacent tines of the plurality of tines. A subset of the tines are shaped between their first ends and their second ends to form slices of a containment basket which is curved in three-dimensions.

19 Claims, 9 Drawing Sheets

VEGETABLE SLICING SHIELD

CROSS-REFERENCE TO RELATED APPLICATIONS

This application claims priority to and benefit of the provisional patent application No. 63/124,210, entitled "VEGETABLE SLICING SHIELD," with filing date Dec. 11, 2020, assigned to the assignee of the present application, and which is herein incorporated by reference in its entirety.

BACKGROUND

Making a chopped salad or slicing vegetables can be a cumbersome exercise and can also expose a person's hands to risk of cutting while holding or positioning the vegetative material which is being sliced.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims.

Furthermore, in this Description of Embodiments, numerous specific details are set forth in order to provide a thorough understanding of embodiments of the present subject matter. However, embodiments may be practiced without these specific details. In other instances, well known methods, procedures, and components have not been described in detail as not to unnecessarily obscure aspects of the described embodiments.

Overview of Discussion

When slicing vegetative material such as a vegetable, a plurality of vegetables, and/or components of a salad, it can be difficult to slice the vegetative material for a variety of reasons. For example, in some cases the vegetative material may slip or roll around on a cutting surface or it may migrate around the cutting surface in response to being sliced. In other instances, vegetables can be very slick (such as a peeled zucchini) or alter shape during cutting (such as a ripe tomato). In yet other instances, it may be desired to slice vegetative material into fairly uniform piece sizes, and this may be hard to gauge and/or accomplish when slicing a variety of vegetables at once. Because of these and other issues, the ever-present risk of cutting oneself while slicing vegetables can be alleviated.

Herein a vegetable slicing shield is described which contains vegetative material against a cutting surface to facilitate slicing, holds bulky vegetables in position for slicing, acts as a guide for uniform slicing, and also operates as a shield to shield against and reduce the opportunity for cutting oneself while slicing vegetables.

Discussion begins with description of various views and components of a vegetable slicing shield. Discussion continues with description of some features which may be included in a vegetable slicing shield. Discussion concludes with description of depictions of the vegetable slicing shield in use to contain vegetative against a cutting surface in a manner which facilitates a person easily and safely slicing the vegetative material with a knife.

Example Vegetable Slicing Shield

Figure 1:
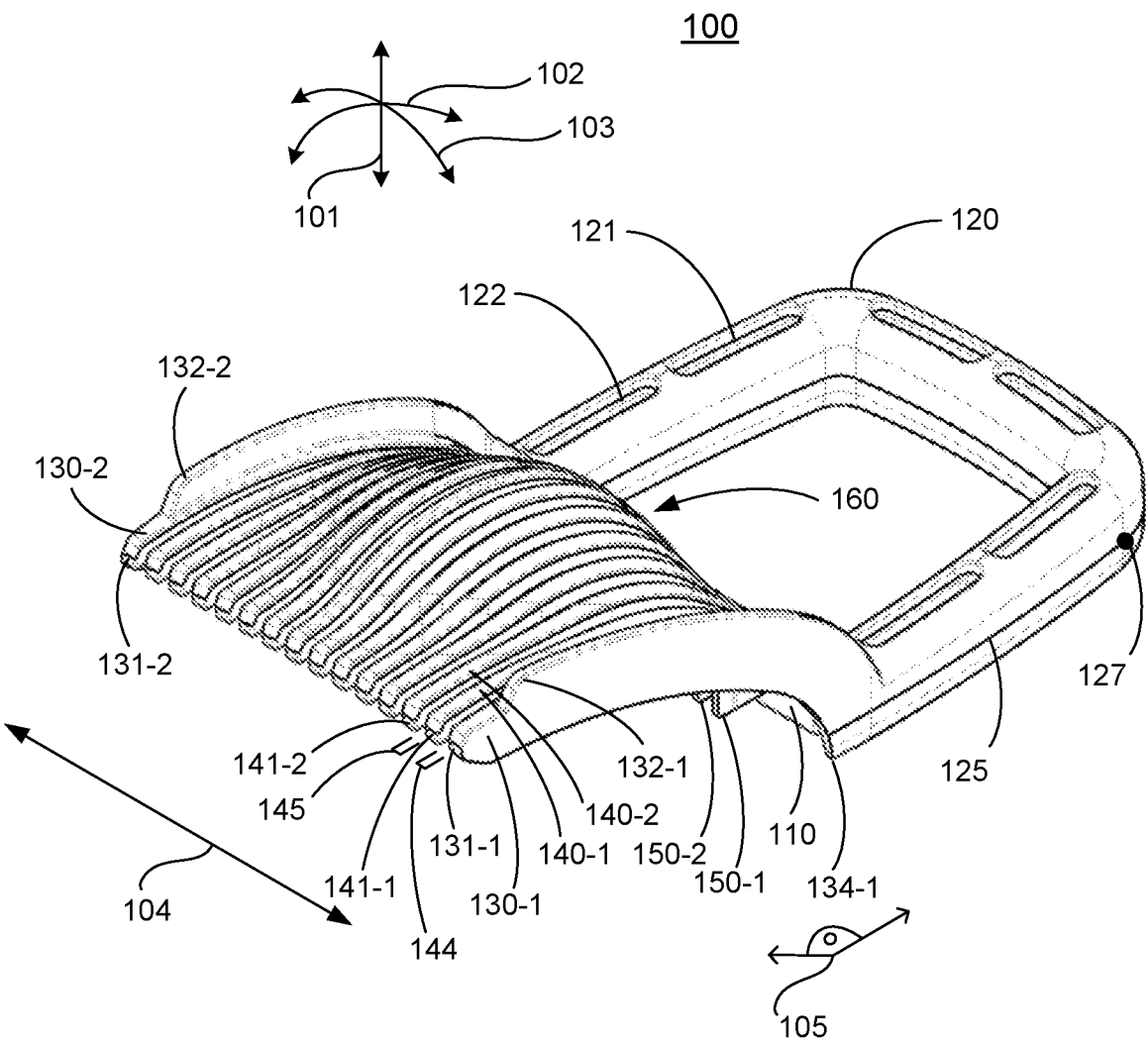
FIG. 1 is a top right front perspective view of the vegetable slicing shield, according to an embodiment.

FIG. 1 is a top right front perspective view of the vegetable slicing shield 100, according to an embodiment. The vegetable slicing shield 100 includes a u-shaped handle 120, a medially disposed root 110, and a plurality of tines (130, 140). The root 110 is medial in that it is located near the center of the vegetable slicing shield 100.

Figure 2:
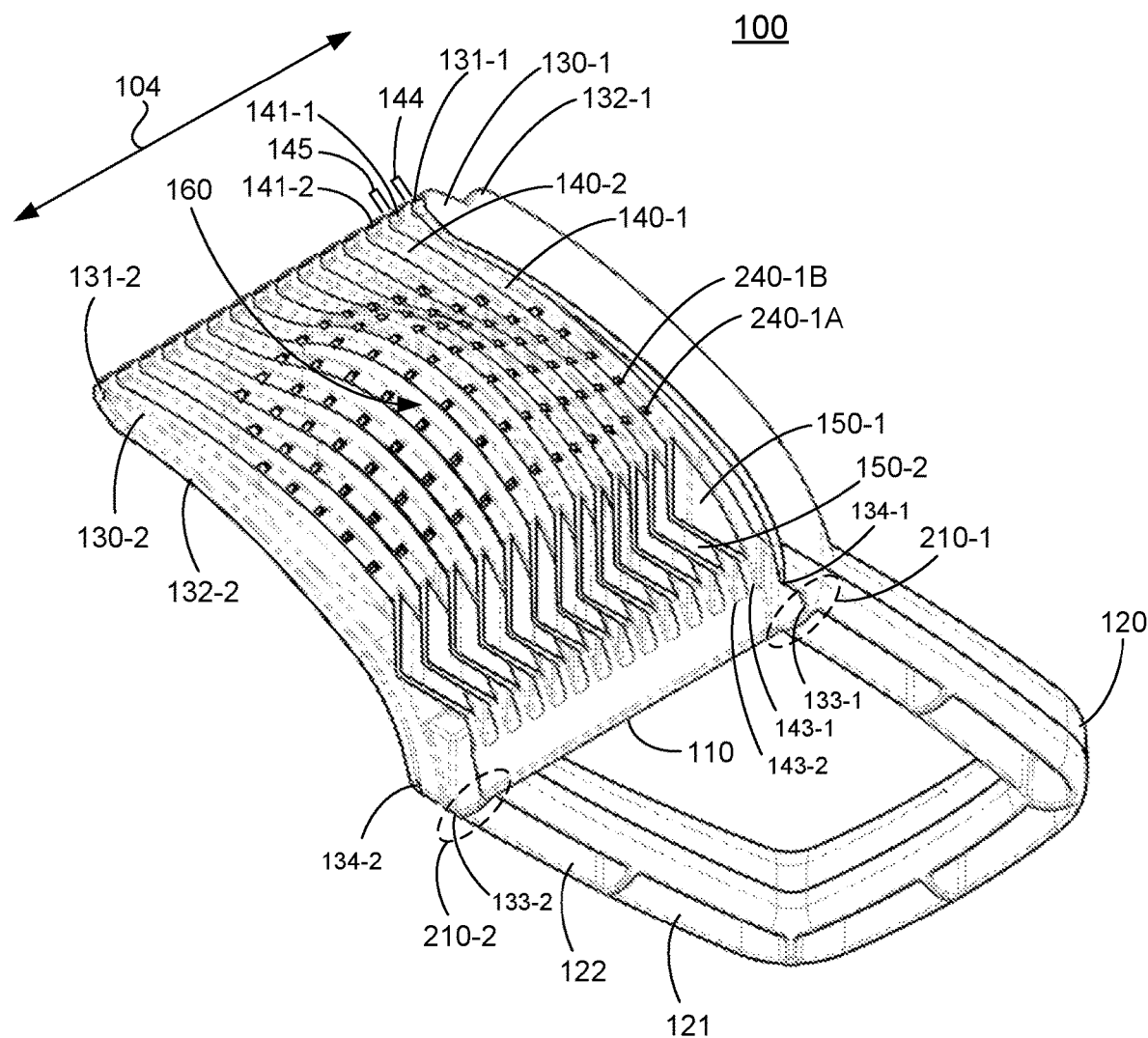
FIG. 2 is a bottom right front perspective view of the vegetable slicing shield, according to an embodiment.

A first side of the root 110 (the first side is visible in FIGS. 6, 7, and 8) is coupled with the u-shaped handle 120 at opposing lateral regions (e.g., 210-1 and 210-2, as illustrated in FIG. 2) of a first side of the root 110. In some embodiments, the root 110, handle 120, and tines 130 and 140 are formed of the same material. This material may be a plastic material such as injection molded plastic of any suitable type.

A plurality of tines such as tines 130 (e.g., 130-1 and 130-2) and 140 (e.g., 140-1, 140-2, and the like) have first ends 133 (e.g., 133-1 and 133-2 shown in FIG. 2) and 143 (e.g., 143-1, 143-2, etc. shown in FIG. 2) coupled with a second side of the root 110 and extending outward from the root to second ends of the tines 130 and 140. The second ends of the tines (130, 140) end in a row of spaced apart points (e.g., 131-1, 131-2, and 141-1, 142-2, etc.). In some embodiments, the row of spaced apart points (e.g., 131-1, 131-2, and 141-1, 142-2, etc.) is linear, as shown by line 104 which is parallel to the row of spaced apart points (e.g., 131-1, 131-2, and 141-1, 142-2, etc.).

As depicted, there are two edge tines 130-1 and 130-2 between which a plurality of interior tines 140 (e.g., 140-1, 140-2, etc.) are disposed. These edge tines 130 are the lateral most tines and bracket the interior tines 140. In some embodiments, when in use, the distal ends 131-1 and 131-2 of tines 130-1 and 130-2 are placed in contact/near contact with a cutting surface at the same time as the contact points 134-1 and 134-2 (visible in FIG. 2) which are located at the medial ends of tines 130-1 and 130-2 respectively. In some embodiments, the interior tines 140 greatly outnumber (e.g., by 3 to 15 times) the number of exterior tines 130. For example, there are two exterior tines 130 and thirteen interior tines 140 depicted in FIG. 1. In some embodiments, a majority of the plurality of tines (e.g., many or all of tines 140) are of substantially the same width (in direction 104) as one another along their lengths between the root 110 and their respective points 141. As illustrated in FIG. 1, open slots are defined between adjacent tines, for example slot 144 is defined between tine 130-1 and tine 140-1 and slot 145 is defined between tine 140-1 and tine 140-2. In this manner, there are a plurality of tines and a plurality of open slots defined between the tines. In some embodiments, the slots (145, 144, and the like) are open and unobstructed from the root 110 outward. Tines are generally sized to space apart cuts of vegetative material. Open slots are generally sized to easily permit a cutting knife, such as a chef's knife, to move freely through the slots while cutting vegetative material. In some embodiments, the width of an open slot (145, 144, or the like) of the open slots is narrower in width than an adjacent tine of the plurality of tines. For example, slot 145 is narrower than either tine 140-1 or 140-2 and slot 144 is narrow than tine 140-1 or tine 130-1. In some embodiments, the width of an open slot (145, 144, or the like) of the open slots is between ⅛ to ½ of the width of an adjacent tine of the plurality of tines. An additional function of the open slots (144, 145, or the like) is that they permit a user (e.g., a human) of vegetable slicing shield 100 to see through the slots to view the vegetative material being sliced.

In some embodiments, at least a subset of the tines (e.g., all or many of interior tines 130) are shaped between their first ends and their second ends to form slices of a containment basket 160 which is curved in three-dimensions (e.g., represented by directions 101, 102, and 103). In some embodiments, the shape of the basket formed by the tines may be hemispherical or bowl shaped. Because the tines are spaced apart as they form the slices of the containment basket 160, there are corresponding spaces in the containment basket. FIG. 1 illustrates the upper surfaces of the convex outer side of the containment basket 160, the underside of which (illustrated in FIG. 2) provides a space for containing vegetative material between the tines 130, 140 and a cutting surface (not depicted).

Because of its u-shape, handle 120 is ambidextrous, in that it equally facilitates left-handed and right-handed gripping by a hand of a human user. Additionally, u-shaped handle 120 is easily gripped in multiple places on its sides, end, and/or corners, and is easily gripping by multiple sizes of hands. In some embodiments, a plurality of through holes (121, 133, and the like) are defined within handle 120 and configured to diminish collection of water during dishwashing of vegetable slicing shield 100. In some embodiments, the through holes (121, 122, etc.), also increase structural integrity of handle 120. As depicted, in some embodiments, handle 120 is coupled to root 110 at an angle 105 which is ergonomic for human grip when vegetative material is contained between the containment basket 160 and a cutting surface. In Some embodiments, an angle 105 defined between the end 131-1 of tine 130-1 and a point 127 on the distal mid-line 125 of side of handle 120 (with contact point 134-1 as a vertex) may be between about 110 degrees and about 160 degrees. In other embodiments, angle 105 may be between about 130 degrees and 150 degrees. The combination of the u-shape and the ergonomic angle 105, facilitate gripping of handle 120 by persons of different heights (who may be standing at a fixed height work surface such as a kitchen counter) and by persons of differing grip strength and overall physical strength/abilities. The u-shaped handle 120 facilitates use of the vegetable slicing shield 100 by persons with wide disparities in physical capability and ability. For example, a strong and fully-abled person can grasp and utilize u-shaped handle 120. Likewise, a differently-abled person with only limited strength or use of their hand (e.g., an elderly person, arthritic person, stroke victim, etc.) can easily grasp and utilize u-shaped handle 120 as it affords numerous graspable locations and graspable angles to position a gripping hand.

Although a u-shaped handle 120 is depicted, other shapes a handle 120 may be utilized, in some embodiments. For example, in some embodiments, a stick shaped handle with a single shaft may be coupled at a single point (e.g., a central region) of the first side of medially disposed root 110. Such a stick-shaped handle is ambidextrous in that it equally facilitates left-handed and right-handed gripping by a hand of a user. In yet another embodiment, a t-shaped handle may be utilized with a base of the t-shaped handled coupled to a single point (e.g., a central region) of the first side of medially disposed root 110 in a manner leaving the shaft and cap of the t-shaped handle for gripping by a hand of a human user. Such a t-shaped handle is ambidextrous in that it equally facilitates left-handed and right-handed gripping by a hand of a human user. In yet other embodiments, a handle may be utilized which is similar to u-shaped handle 120 except for being semi-circular or semi-ovular in shape rather than u-shaped.

Figure 5:
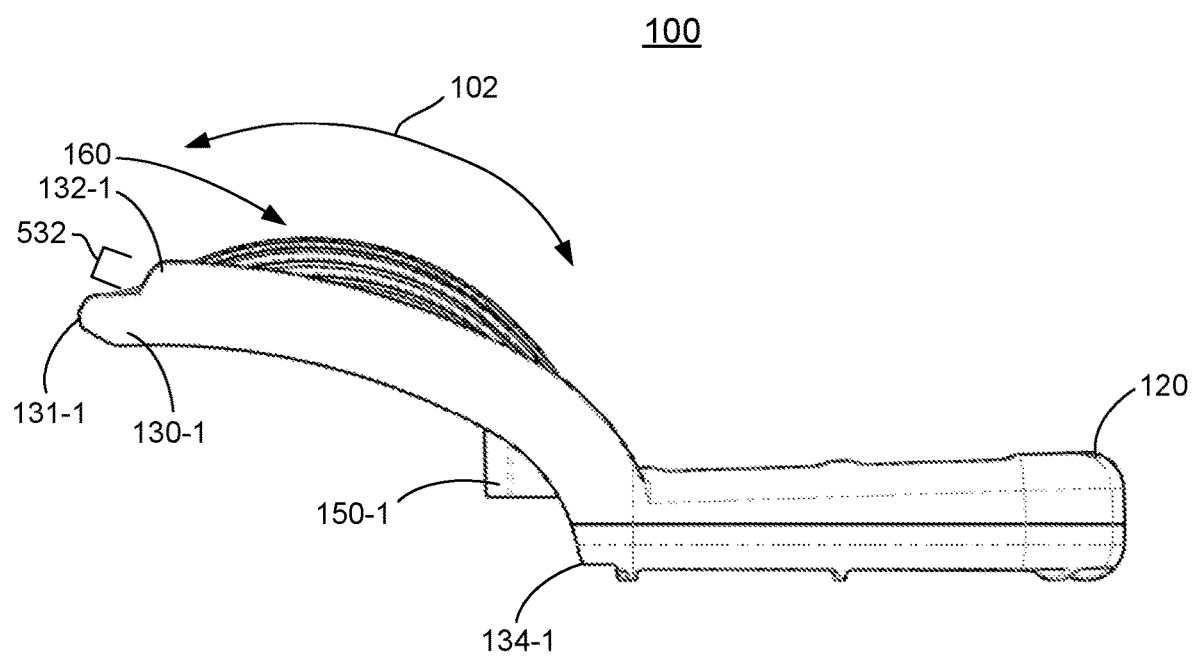
FIG. 5 is a right side view of the vegetable slicing shield, according to an embodiment; the left side view is a mirror image of the right side view.

In some embodiments, a raised knife guard 132 (131-1, 131-2) is coupled with a lateral most tine 130 of the plurality of tines (130, 140) and extends substantially orthogonally (i.e., in direction 101) from the direction (104) of the row of spaced apart points (131, 141). With reference to FIG. 5, the raised knife guard 132 (e.g., 132-1) is raised some distance 532 (e.g., between ⅛ inch and 1 inch) above the surface of an adjacent interior tine (e.g., tine 140-1), such that it provides a lateral guard for a cutting knife which is being used to slice vegetative material via slots 144, 145.

FIG. 2 is a bottom right front perspective view of the vegetable slicing shield, according to an embodiment. As depicted more fully by FIG. 2, in some embodiments, a vegetable stop 150 (e.g., 150-1) may be coupled with the underside of a tine 140 (e.g., tine 140-1) and/or with the root 110. A plurality of tines 130 and/or 140 may be configured with vegetable stop. For example, tine 140-1 is coupled with vegetable stop 150-2 and in a similar manner tine 140-2 is coupled with vegetable stop 150-2. One or more other tines may be similarly coupled with a respective vegetable stop. Vegetable stops 150 space vegetative material apart from root 110 when the vegetative material is contained between the containment basket 160 and a cutting surface. This spacing provides an access region for a knife between the root 110 and the vegetative material, and thus facilitates a user cleanly and fully cutting the vegetable material contained between containment basket 160 and a cutting surface.

With continued reference to FIG. 2, in some embodiments, vegetable slicing shield 100, may also include a plurality of angled protrusions 240 spaced along the concave side (i.e., the underside) of a tine (130, 140). The angled protrusions are like small burrs or teeth and are configured to engage with and diminish movement of bulky vegetative material contained between the containment basket 160 and a cutting surface. For example, protrusions 240 provide additional friction to allow the vegetable slicing shield 100 to grab the surface of bulky or leafy vegetables such as broccoli, lettuce, and spinach and more securely position them for and during slicing operations. Protrusions 240-1A and 240-1B on the concave side of tine 140-1 are two examples of such protrusions. In some embodiments, when included, some or all of tines 130, 140 may include angled protrusions. In some embodiments, the angled protrusions 140 may be triangular or quadrangular in shape. In some embodiments, the angled protrusions 240 may protrude between 0.5 mm to 4 mm from a tine (130, 140). Individual angled protrusions 240 may be of similar or different sizes, shapes, and orientations.

Figure 3:
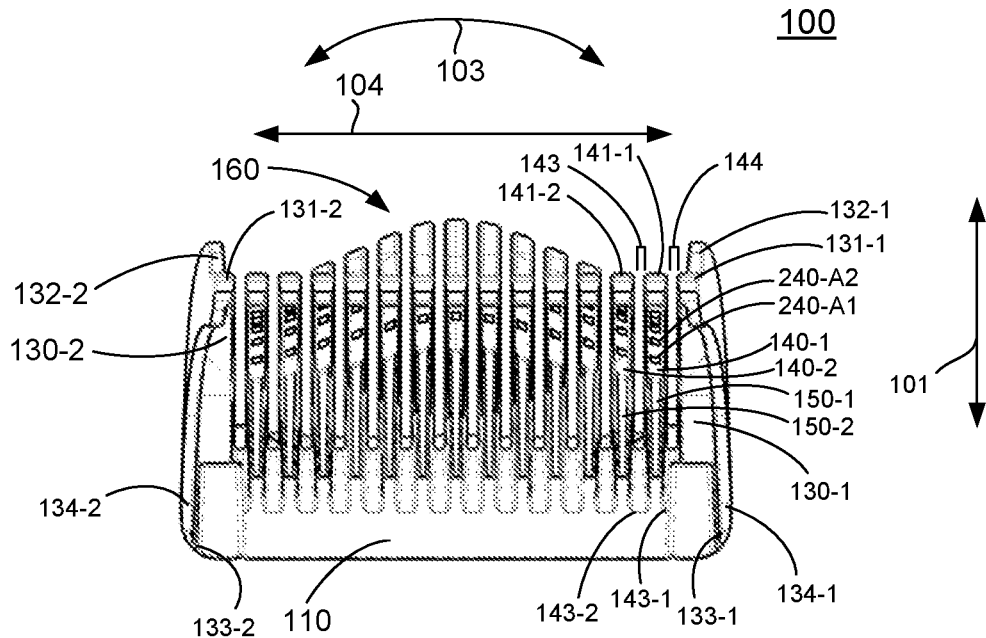
FIG. 3 is a front view of a vegetable slicing shield, according to an embodiment.

FIG. 3 is a front view of vegetable slicing shield 100, according to an embodiment. The side-to-side, lateral curvature 103 of basket 160 readily visible in FIG. 3. Likewise, the top-top-bottom curvature 101 of basket 160 readily visible in FIG. 3.

Figure 4:
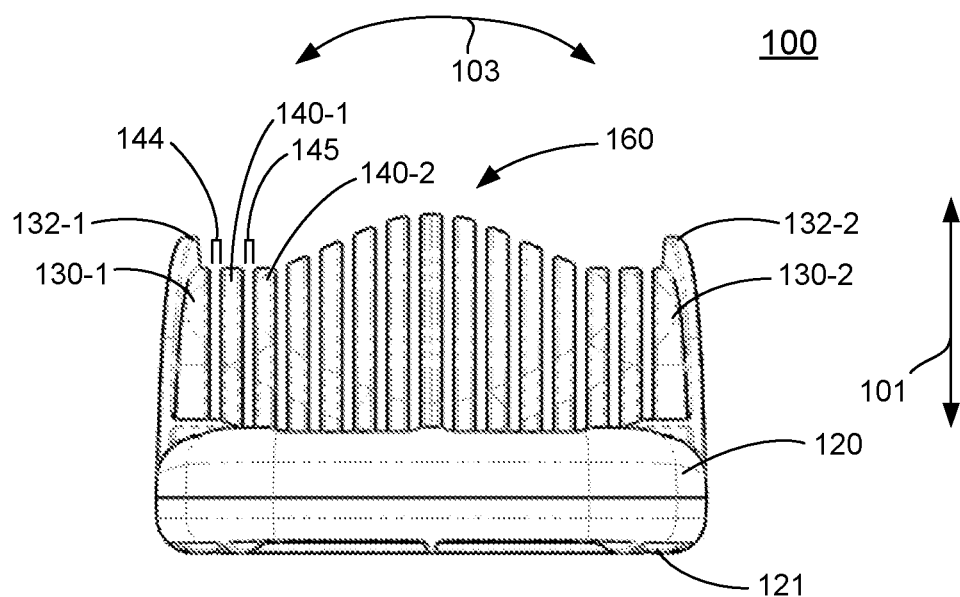
FIG. 4 is a rear view of the vegetable slicing shield, according to an embodiment.

FIG. 4 is a rear view of vegetable slicing shield 100, according to an embodiment. The side-to-side, lateral curvature 103 of basket 160 readily visible in FIG. 4. Likewise, the top-top-bottom curvature 101 of basket 160 readily visible in FIG. 4.

FIG. 5 is a right side view of vegetable slicing shield 100, according to an embodiment. The midline, medial-to-distal curvature of basket 160 is readily visible in FIG. 5. The left side view is a mirror image of the right side view.

Figure 6:
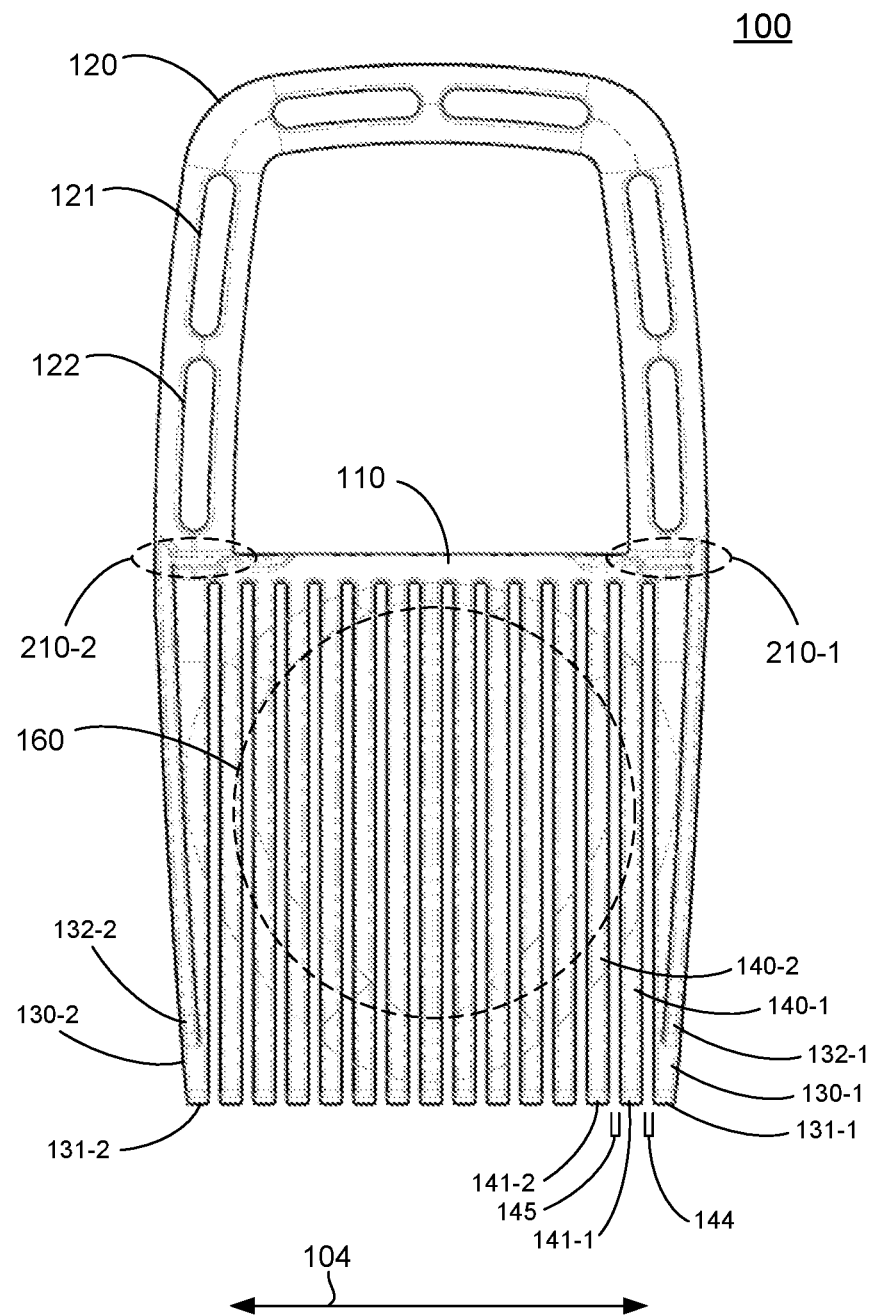
FIG. 6 is a top view of the vegetable slicing shield, according to an embodiment.

FIG. 6 is a top view of vegetable slicing shield 100, according to an embodiment. The overall circular footprint of the exterior of basket 160 (illustrated by dashed lines) is readily visible in FIG. 6.

Figure 7:
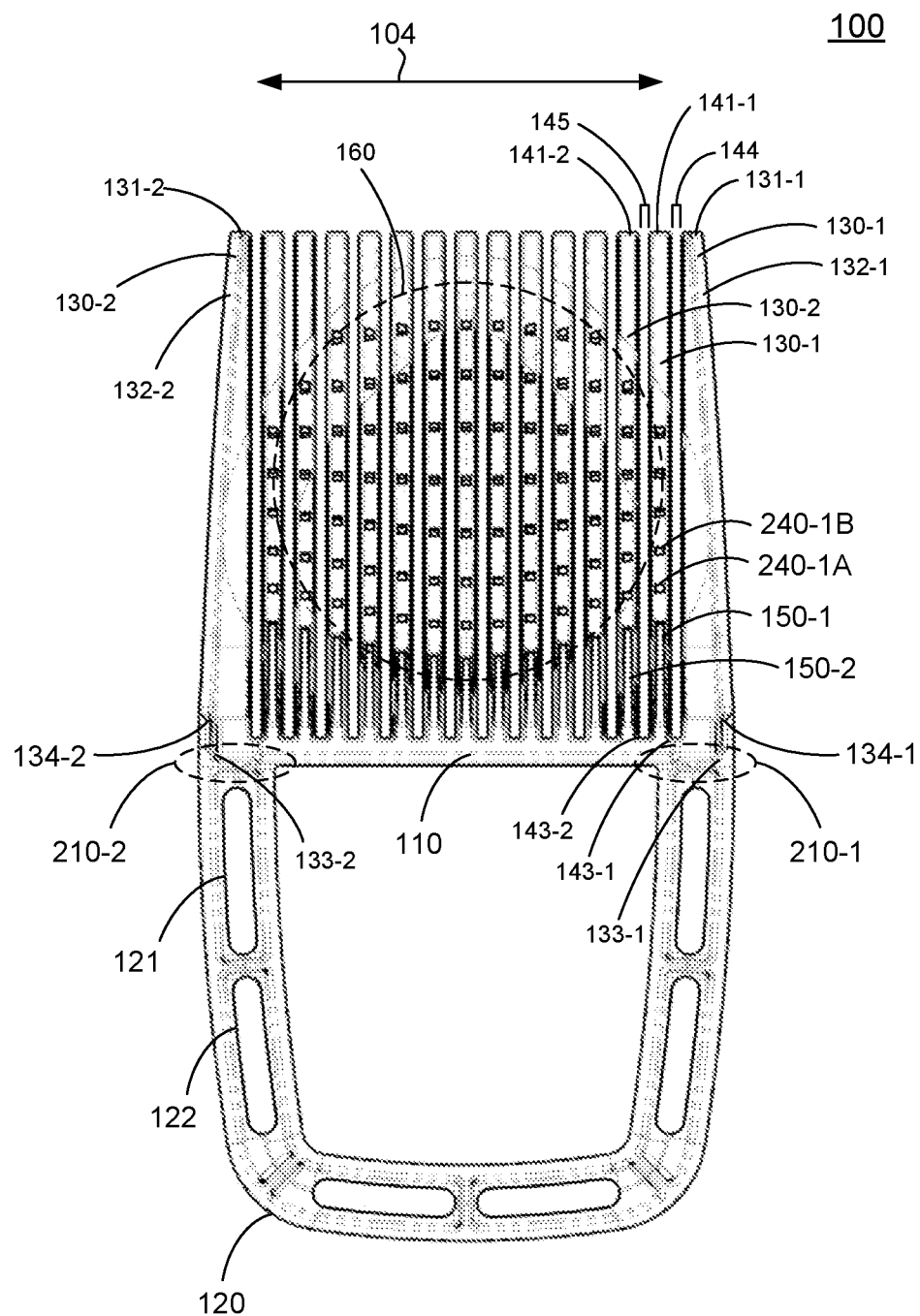
FIG. 7 is a bottom view of the vegetable slicing shield, according to an embodiment.

FIG. 7 is a bottom view of vegetable slicing shield 100, according to an embodiment. The overall circular footprint of the interior of basket 160 (illustrated by dashed lines) is readily visible in FIG. 7.

Example Use of Vegetable Slicing Shield

Figure 8:
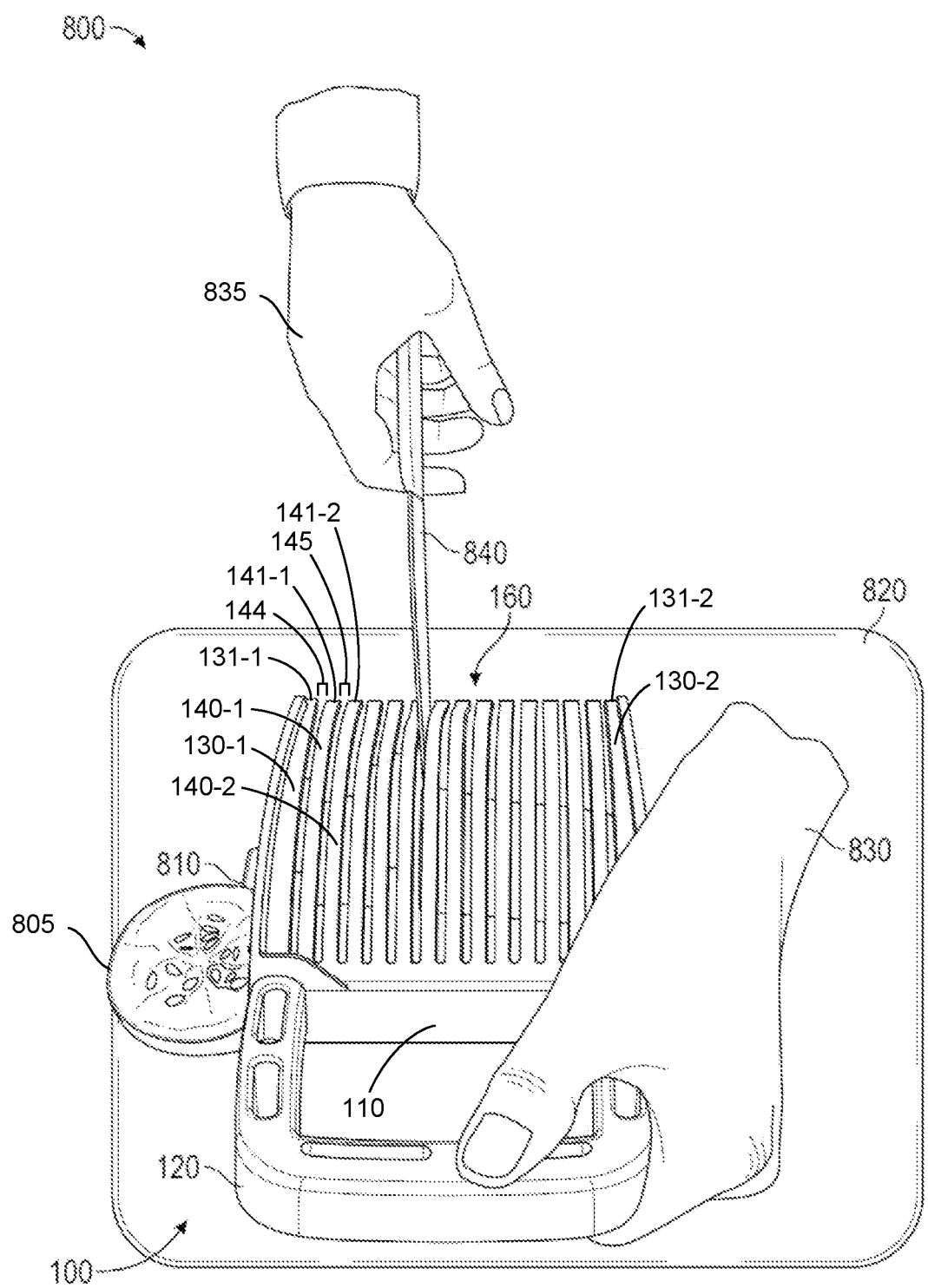
FIG. 8 illustrates an upper rear view of the vegetable slicing shield with vegetative material contained between a containment basket of the slicing shield and a cutting surface for slicing, according to an embodiment.

FIG. 8 illustrates an upper rear view of the vegetable slicing shield 100 with vegetative material 810 contained between a containment basket 160 of the slicing shield 100 and a cutting surface 820, according to an embodiment. In the example of FIG. 8, the vegetative material 810 is lettuce. Another previously sliced vegetable, zucchini slice 805, is located next to the next to the vegetable slicing shield 100 for incorporation and further slicing as part of a chopped salad being made with the sliced leaves of lettuce 810.

A gripping hand 830 of a human user holds handle 120 while a knife 840 is inserted through slots 144, 145, etc. defined by tines 130, 140 of basket 160. As depicted, knife 840 may held by a slicing hand 835 and inserted in and run through one or more of the slots (e.g., 144, 145, and the like), to cut vegetative material 810 against cutting surface 820 while vegetative material 810 is safely and securely held in place between the containment basket 160 and cutting surface 820. For example, vegetable stops 150 and/or protrusions 240 on the concave side of basket 160 of vegetable slicing shield 100 engage with vegetative material 810 to limit its movement while being sliced by knife 840. As illustrated, gripping hand 830 remains safely out of the path of knife 840 during the cutting of the vegetative material 810, while knife 840 can fully access the vegetative material 810 and slice downward to cutting surface 820 and outward through the slots between the distal ends 131, 141 of the tines 130 and 140 which form basket 160. It should be noted that the human user can select various widths of slices to apply to vegetative material 810 based on which slots 145, 145, etc. between tines 130, 140 are used as slicing guides for knife 840.

Figure 9:
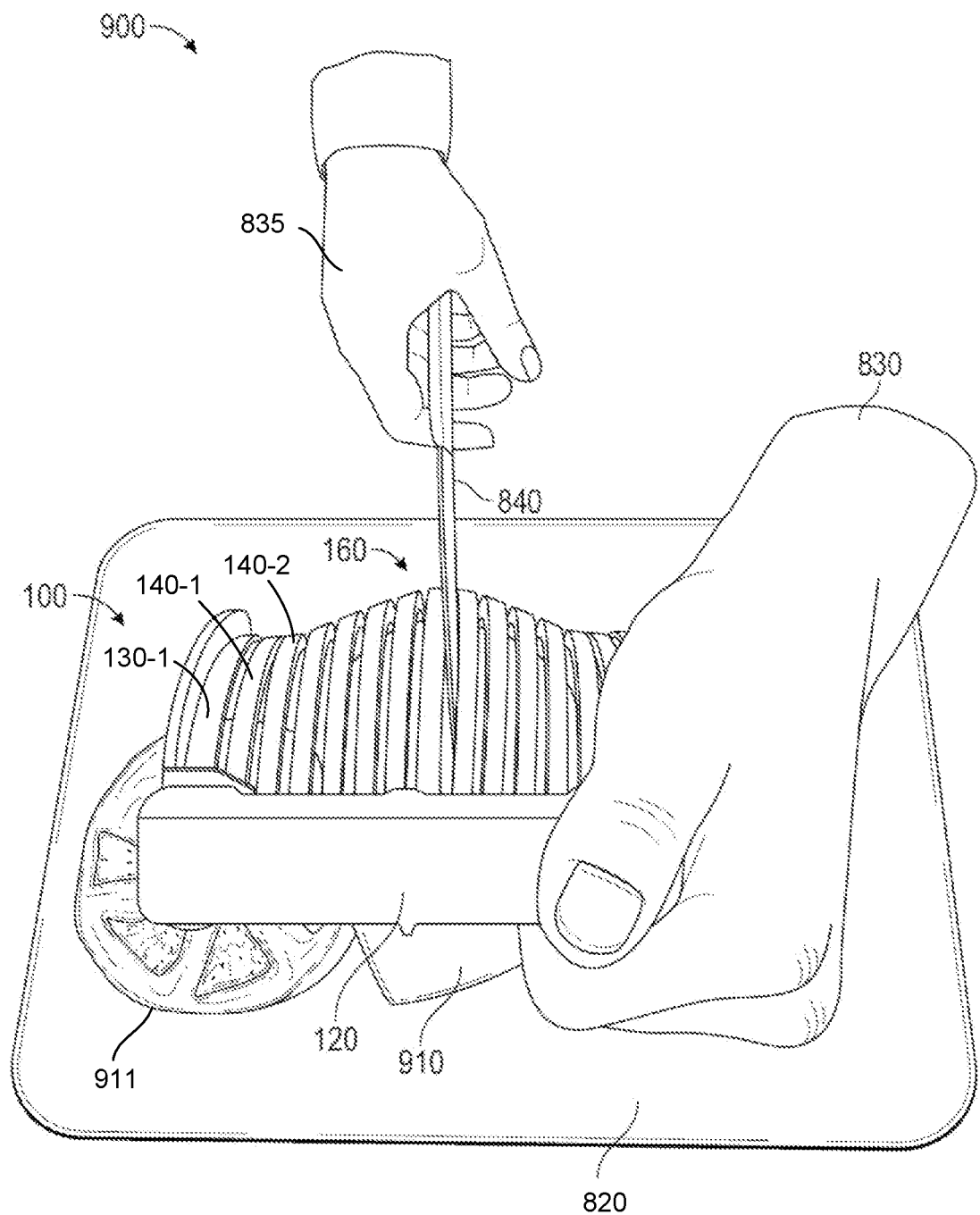
FIG. 9 illustrates an upper rear view of the vegetable slicing shield with vegetative material contained between a containment basket of the slicing shield and a cutting surface for slicing, according to an embodiment.

FIG. 9 illustrates an upper rear view of the vegetable slicing shield 100 with vegetative material 910 contained between a containment basket 160 of the slicing shield 100 and a cutting surface 820, according to an embodiment. In the example of FIG. 9, the vegetative material 910 is a tomato, and a sliced portion 911 of the tomato 910 is illustrated.

A gripping hand 830 of a human user holds handle 120 while a knife 840 is inserted through slots 144, 145, etc. defined by tines 130, 140 of basket 160. As depicted, knife 840 may held by a slicing hand 835 of the human user and inserted in and run through one or more of the slots (e.g., 144, 145 and the like), to cut vegetative material 910 against cutting surface 820 while vegetative material 910 is safely and securely held in place between the containment basket 160 and cutting surface 820. The vegetative material 910 (tomato) of FIG. 9 is very different than the substantially flat vegetative material 810 (lettuce leaves) which was illustrated in FIG. 8. Accordingly, vegetable slicing shield 100 is held at a different angle to accommodate the tomato 910 of FIG. 9, versus the holding angle illustrated in FIG. 8, so that the substantially spherical shape of a tomato 910 is accommodated by basket 160. For example, vegetable stops 150 and/or protrusions 240 on the concave side of basket 160 of vegetable slicing shield 100 engage with vegetative material 910 to limit its movement while being sliced by knife 840. As illustrated, gripping hand 830 remains safely out of the path of knife 840 during the cutting of the vegetative material 910, while knife 840 can fully access the vegetative material 910 and slice downward to cutting surface 820 and outward through the slots between the distal ends 131, 141 of the tines 130 and 140 which form basket 160. It should be noted that the human user can select various widths of slices to apply to vegetative material 910 based on which slots 144, 145, etc. between tines 130, 140 are used as slicing guides for knife 840.

Figure 10:
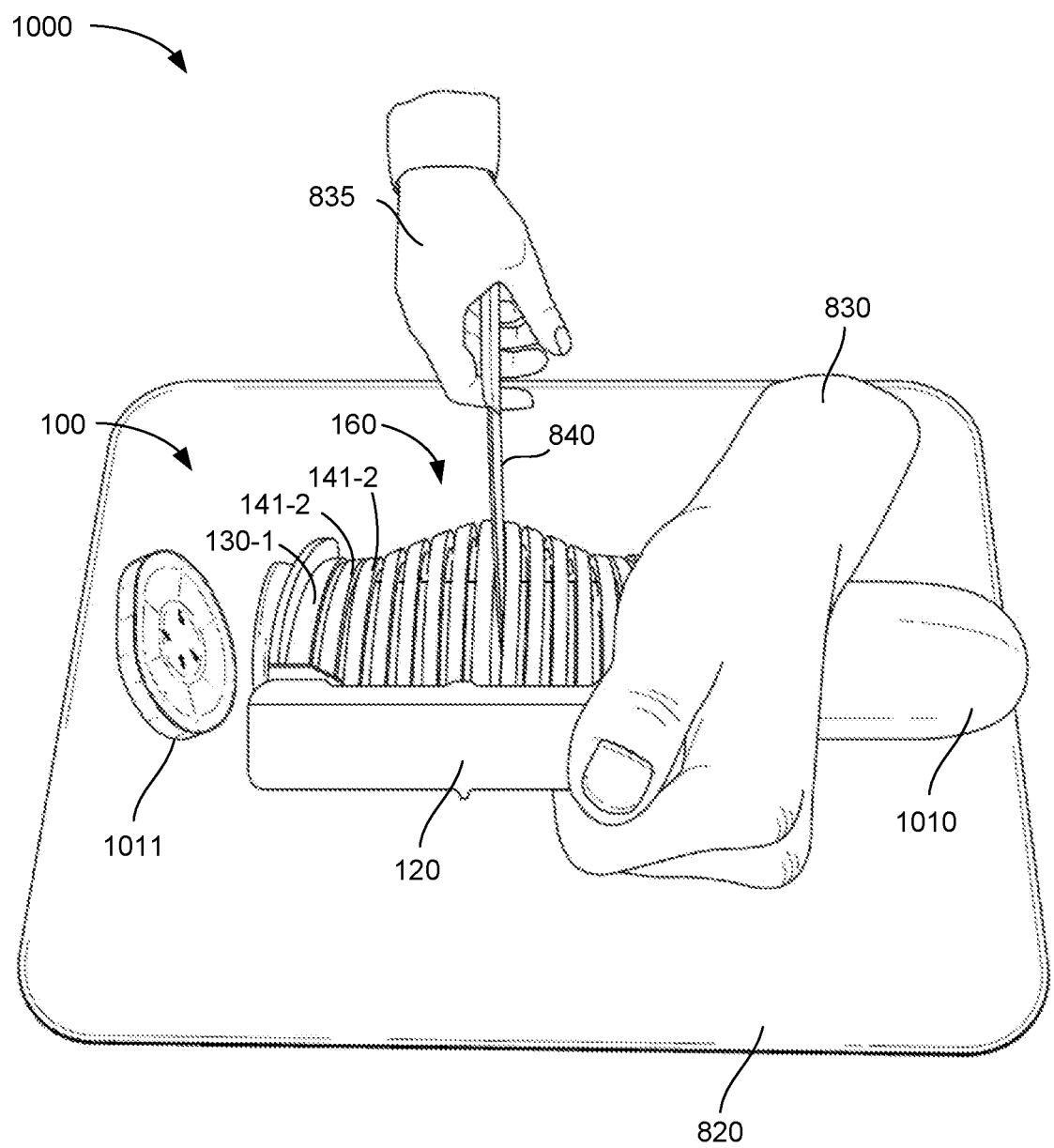
FIG. 10 illustrates an upper rear view of the vegetable slicing shield with vegetative material contained between a containment basket of the slicing shield and a cutting surface for slicing, according to an embodiment.

FIG. 10 illustrates an upper rear view of the vegetable slicing shield 100 with vegetative material 1010 contained between a containment basket 160 of the slicing shield 100 and a cutting surface 820, according to an embodiment. In the example of FIG. 10, the vegetative material 1010 is a cucumber, and a sliced portion 1011 of the cucumber 1010 is illustrated.

A gripping hand 830 of a human user holds handle 120 while a knife 840 is inserted through slots 144, 145, etc. defined by tines 130, 140 of basket 160. As depicted, knife 840 may held by a slicing hand 835 of the human user and inserted in and run through one or more of the slots (e.g., 144, 145 and the like), to cut vegetative material 1010 against cutting surface 820 while vegetative material 1010 is safely and securely held in place between the containment basket 160 and cutting surface 820. The long, cylindrical vegetative material 1010 (cucumber) of FIG. 10 is very different than the relatively flat vegetative material 810 (lettuce) which was illustrated in FIG. 8 or the somewhat spherical tomato 910 illustrated in FIG. 9. Accordingly, vegetable slicing shield 100 is held at a different angle to accommodate this cylindrical shape in FIG. 10, versus the holding angle shown in FIG. 8, so that the substantially cylindrical shape of a cucumber 1010 is accommodated by basket 160. For example, vegetable stops 150 and/or protrusions 240 on the concave side of basket 160 of vegetable slicing shield 100 engage with vegetative material 1010 to limit its movement while being sliced by knife 840. As illustrated, gripping hand 830 remains safely out of the path of knife 840 during the cutting of the vegetative material 1010, while knife 840 can fully access the vegetative material 1010 and slice downward to cutting surface 820 and outward through the slots between the distal ends 131, 141 of the tines 130 and 140 which form basket 160. It should be noted that the human user can select various widths of slices to apply to vegetative material 1010 based on which slots 144, 145, etc. between tines 130, 140 are used as slicing guides for knife 840.

FIGS. 8, 9, and 10 illustrate trapping all or a portion of the material being sliced (e.g., vegetative material) beneath basket 160 and tines 130 and 140. While the ends 131, 141 of the tines 130, 140 are in contact with cutting surface 820, handle 120 is gripped and rotated/pressed so that it is lowered toward the cutting surface by the user of vegetable slicing shield 100. The ergonomic angle of the handle with respect to ends 131, 141 both assists in preventing the hand 830 from bumping into surface 820 and also with providing proper leverage for lowering the tines 130, 140 and basket 160 in this pivoting manner. Through this action by the user vegetative material is pinned in place between the underside of basket 160 and/or tines 130 and 140 and the top of the cutting surface 820. With the vegetables or other material to be sliced thus engaged, stability and safety are increased as the material being sliced is firmly pinned such that is it is more easily sliced. In this manner, cutting surface 820 is effectively used as an extra hand to help securely hold in place material for slicing rather than simply being a surface which is contacted by the knife 840 during slicing operations.

In the same or similar manner illustrated in FIGS. 8, 9, and 10, other vegetative material, combinations of vegetative material (e.g., a variety of vegetables used to make a chopped salad), meats, nuts, etc. may be conveniently and safely cut into smaller sized pieces of a desired width by selecting the slots 144, 145, or the like, through which a knife 840 is inserted to perform the cutting. Likewise, after slicing in one direction, the vegetable slicing shield 100 can be lifted and then turned (e.g., by approximately 90 degrees) to crosscut previously sliced material. Although gripping hand 830 is illustrated as a left hand in FIGS. 8, 9, and 10, it should be noted that handle 120 can be similarly gripped by cutting hand 835 in an ambidextrous manner (e.g., in a mirror image of what is illustrated in FIGS. 8, 9, and 10).

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A vegetable slicing shield comprising:
a u-shaped handle configured for gripping by a human user;
a medially disposed root coupled with the u-shaped handle at opposing lateral regions of a first side of the root;
a plurality of tines with first ends coupled with a second side of the root and extending outward from the root to second ends which form a row of spaced apart points, wherein open slots are defined between adjacent tines, and wherein a subset of the plurality of tines are shaped between their first ends and their second ends to form slices of a containment basket which is curved in three-dimensions; and
a vegetable stop coupled with a tine and with the root and configured to space a vegetative material apart from the root when the vegetative material is contained between the containment basket and a cutting surface such that a knife access region for cutting the vegetative material is provided between the root and the contained vegetative material.

2. The vegetable slicing shield of claim 1, further comprising:
a plurality of angled protrusions spaced along a concave side of a tine and configured to engage with and diminish movement of bulky vegetative material contained between the containment basket and a cutting surface.

3. The vegetable slicing shield of claim 1, further comprising:
a raised knife guard coupled with a lateral most tine of the plurality of tines and extending substantially orthogonally from a direction of the row of spaced apart points.

4. The vegetable slicing shield of claim 1, wherein the u-shaped handle comprises:
a plurality of through holes defined within the u-shaped handle and configured to diminish collection of water during dishwashing of the vegetable slicing shield.

5. The vegetable slicing shield of claim 1, wherein the u-shaped handle is coupled to the root at an angle which is ergonomic for human grip when vegetative material is contained between the containment basket and a cutting surface.

6. The vegetable slicing shield of claim 1, wherein the u-shaped handle is configured for ambidextrous gripping by a human user of vegetable slicing shield.

7. The vegetable slicing shield of claim 1, wherein an open slot of the open slots is narrower in width than an adjacent tine of the plurality of tines.

8. The vegetable slicing shield of claim 1, wherein a width of an open slot of the open slots is ¼ to ½ of the width of an adjacent tine of the plurality of tines.

9. The vegetable slicing shield of claim 1, wherein a majority of the plurality of tines are of a substantially same width as one another along their lengths between the root and their respective points in the row of spaced apart points.

10. The vegetable slicing shield of claim 1, wherein the root, handle, and tines are formed of injection molded plastic.

11. A vegetable slicing shield comprising:
a handle configured for ambidextrous gripping by a human user;
a medially disposed root coupled with the handle on a first side of the root;
a plurality of tines with first ends coupled with a second side of the root and extending outward from the root to second ends which form a row of spaced apart points, wherein open slots are defined between adjacent tines, and wherein a subset of the plurality of tines are shaped between their first ends and their second ends to form slices of a containment basket which is curved in three-dimensions; and
a vegetable stop coupled with a tine and with the root and configured to space a vegetative material apart from the root when the vegetative material is contained between the containment basket and a cutting surface such that a knife access region for cutting the vegetative material is provided between the root and the contained vegetative material.

12. The vegetable slicing shield of claim 11, further comprising:
a plurality of angled protrusions spaced along a concave side of a tine and configured to engage with and diminish movement of bulky vegetative material contained between the containment basket and a cutting surface.

13. The vegetable slicing shield of claim 11, further comprising:
a raised knife guard coupled with a lateral most tine of the plurality of tines and extending substantially orthogonally from a direction of the row of spaced apart points.

14. The vegetable slicing shield of claim 11, wherein the handle comprises:
a plurality of through holes defined within the handle and configured to diminish collection of water during dishwashing of the vegetable slicing shield.

15. The vegetable slicing shield of claim 11, wherein the handle is coupled to the root at an angle which is ergonomic for human grip when vegetative material is contained between the containment basket and a cutting surface.

16. The vegetable slicing shield of claim 11, wherein an open slot of the open slots is narrower in width than an adjacent tine of the plurality of tines.

17. The vegetable slicing shield of claim 11, wherein a width of an open slot of the open slots is ¼ to ½ of the width of an adjacent tine of the plurality of tines.

18. The vegetable slicing shield of claim 11, wherein a majority of the plurality of tines are of a substantially same width as one another along their lengths between the root and their respective points in the row of spaced apart points.

19. The vegetable slicing shield of claim 11, wherein the root, handle, and tines are formed of injection molded plastic.

* * * * *